United States Patent [19]

Abe et al.

[11] Patent Number: 5,668,229

[45] Date of Patent: Sep. 16, 1997

[54] PROCESS FOR PREPARING HIGH-MOLECULAR WEIGHT ACRYLAMIDE POLYMER

[75] Inventors: Takashi Abe; Hiroshi Itoh; Manabu Tsuruta; Shoko Oyanagi; Kenichi Nakamura, all of Kanagawa-ken, Japan

[73] Assignee: Mitsui Toatsu Chemicals, Inc., Tokyo, Japan

[21] Appl. No.: 747,269

[22] Filed: Nov. 12, 1996

Related U.S. Application Data

[63] Continuation of Ser. No. 419,611, Apr. 10, 1995, abandoned.

[30] Foreign Application Priority Data

Apr. 14, 1994 [JP] Japan ................. 6-075633

[51] Int. Cl.[6] .................. C08F 4/40; C08F 22/38
[52] U.S. Cl. ............. 526/93; 526/219.2; 526/219.5; 526/228; 526/303.1; 526/307.2
[58] Field of Search ................... 526/93, 219.2, 526/303.1, 307.2, 219.5, 228

[56] References Cited

U.S. PATENT DOCUMENTS

| | | | |
|---|---|---|---|
| 3,637,625 | 1/1972 | Buning et al. | 526/63 |
| 3,985,718 | 10/1976 | Chabert et al. | 526/113 |
| 4,138,539 | 2/1979 | Landolt et al. | 526/93 |
| 4,282,340 | 8/1981 | Anchor et al. | 526/93 |
| 4,306,045 | 12/1981 | Yoshida et al. | 526/93 |
| 5,296,577 | 3/1994 | Tamura et al. | 526/220 |

FOREIGN PATENT DOCUMENTS

| | | |
|---|---|---|
| 0528182 | 2/1993 | European Pat. Off. . |
| 2-86603 | 3/1990 | Japan . |
| 1245498 | 8/1971 | United Kingdom . |

OTHER PUBLICATIONS

Database WPI, Section Ch, Week 9018, Derwent Publications Ltd., London GB, class A97, AB 90–137023 & JP0–A–02086603, Mar. 1990 *Abstract*.

*Primary Examiner*—Mark Nagumo
*Attorney, Agent, or Firm*—Burns, Doane, Swecker & Mathis

[57] ABSTRACT

A process for preparing an acrylamide polymer is herein disclosed which comprises the step of initiating polymerization in the presence of an oxidation-reduction system polymerization initiator comprising two or more kinds of oxidizing agents and a reducing agent. According to this process, the polymerization rate can be remarkably increased without bringing about a decrease in the molecular weight of the polymer, and hence, restriction on manufacturing facilities and apparatuses can be relieved and productivity can be remarkably enhanced, which permits a decrease in manufacturing cost.

16 Claims, No Drawings

PROCESS FOR PREPARING HIGH-MOLECULAR WEIGHT ACRYLAMIDE POLYMER

This application is a continuation, of application Ser. No. 08/419,611, filed Apr. 10, 1995 now abandoned.

BACKGROUND OF THE INVENTION (a) Field of the Invention

The present invention relates to process for preparing a high-molecular weight acrylamide polymer which is mainly useful as a high molecular flocculant and as a papermaking chemical. More specifically, it relates to a process for preparing a high-molecular weight acrylamide polymer by initiating polymerization by the use of an oxidation-reduction system polymerization initiator comprising two or more kinds of oxidizing agents.

(b) Description of the Related Art

When an acrylamide polymer is used as a flocculant, it is preferable that the molecular weight of the polymer is as high as possible, so long as handling properties are not impaired, because the polymer having a high molecular weight can exert an excellent flocculation effect and the employment of such a polymer conveniently permits the decrease of its amount to be used. Furthermore, also in the field of a paper strength improver, the polymer having a high molecular weight has been desired in recent years.

Heretofore, a high-molecular weight acrylamide polymer has usually been prepared by carrying out polymerization at the lowest possible polymerization temperature and at the lowest possible concentration of a polymerization initiator. However, when the molecular weight is high, a polymerization solution tends to be in a gel state at the time of the initiation of the polymerization, and immediately stirring becomes impossible and the control of the temperature also becomes impossible. Therefore, in order to control the polymerization temperature to a low level, the polymerization initiation temperature must be low, and in order to inhibit heat generation by the polymerization, the concentration of a polymerization product must also be controlled to a low level.

That is to say, for the preparation of the high-molecular weight acrylamide polymer, the concentration of the polymerization initiator, the polymerization initiation temperature and the concentration of the polymerization product must all be controlled to low levels, and when they are at such low levels, a lengthy period is required for the completion of the polymerization, with the result that the productivity of the polymer deteriorates inconveniently.

When the concentration of the polymerization initiator is merely heightened so as to increase the polymerization rate, the molecular weight of the product decreases. There has not yet been found a technique for preparing a high-molecular weight acrylamide polymer with a high productivity by cutting off the above-mentioned interrelation.

Furthermore, Japanese Patent Application Laid-open No. 268304/1992 discloses a method for preparing a low-molecular weight acrylate polymer such as sodium acrylate and describes the use of a peroxide polymerization initiator and a persulfate in examples, but its effect is not referred to anywhere. Furthermore, in a method for preparing a maleic acid copolymer in Japanese Patent Application Laid-open No. 124711/1991 and a method for preparing a fumaric acid copolymer in Japanese Patent Application Laid-open No. 124712/1991, it has been implied that a peroxide polymerization initiator and a persulfate can be used together, but typical examples are not disclosed anywhere and any effect is not described. Anyway, the above-mentioned conventional techniques are concerned with the methods for preparing the low-molecular weight polymers, and hence they are different from the present invention in an object.

In the preparation of a high-molecular weight acrylamide polymer, the above-mentioned restrictions are present, and as a result, there are the following problems to be solved. (1) A lengthy period is required for the completion of the polymerization, and therefore some restrictions are put on manufacturing facilities and apparatuses. In addition, productivity is low and the manufacturing cost increases. (2) Since the concentration of the polymerization initiator is low, the repeatability of the polymerization is low, and the time taken until the completion of the polymerization is not constant. (3) The concentration of the polymerization initiator and the concentration of the polymerization monomer are low, and hence the polymerization does not completely come to an end, so that unreacted monomers remain.

SUMMARY OF THE INVENTION

In view of the above-mentioned viewpoints, the present inventors have intensively investigated a process for preparing a high-molecular weight acrylamide polymer, and as a result, it has been found that a high-molecular weight acrylamide polymer can be prepared by initiating polymerization in the presence of an oxidation-reduction system polymerization initiator comprising two or more kinds of oxidizing agents. In consequence, the present invention has now been attained.

That is to say, the present invention is directed to a process for preparing a high-molecular weight acrylamide polymer which comprises the step of polymerizing (meth)acrylamide or copolymerizing (meth)acrylamide and one or more unsaturated monomers copolymerizable with (meth)acrylamide in the presence of an oxidation-reduction system polymerization initiator comprising a reducing agent and two or more kinds of oxidizing agents selected from the group consisting of persulfates, hydrogen peroxide, metal peroxides, hydroperoxides, dialkyl peroxides, diacyl peroxides, ketone peroxides, dialkylperoxy dicarbonates, peracids and peracid esters.

In the process for preparing the high-molecular weight acrylamide polymer, it is effective to carry out the polymerization at a relatively low temperature, and the polymerization is usually done with the aid of oxidation-reduction system polymerization initiator. However, in the present invention, the process for preparing a high-molecular weight acrylamide polymer by virtue of the oxidation-reduction system polymerization initiator is characterized in that the polymerization rate can be remarkably increased by the use of the two kinds or more of oxidizing agents substantially without lowering the molecular weight of the product. Thus, according to the present invention, the preparation of a high-molecular weight acrylamide polymer which has heretofore been difficult to produce can be carried out with good repeatability and high efficiency, so that the restriction on the manufacturing facilities can also be relieved.

The acrylamide polymer (polyacrylamide) which can be prepared by the present invention means a homopolymer of acrylamide or methacrylamide, or a copolymer of acrylamide or methacrylamide and one or more unsaturated monomers copolymerizable with acrylamide or methacrylamide.

Examples of the copolymerizable monomers include hydrophilic monomers, ionic monomers and lipophilic monomers, and one or more of these monomers can be used.

Examples of the hydrophilic monomers include diacetone acrylamide, N,N-dimethylacrylamide, N,N-dimethylmethacrylamide, N-ethylmethacrylamide, N-ethylacrylamide, N,N-diethylacrylamide, N-propylacrylamide, N-acryloylpyrrolidine, N-acryloylpiperidine, N-acryloylmorpholine, hydroxyethyl methacrylate, hydroxyethyl acrylate, hydroxypropyl methacrylate, hydroxypropyl acrylate, methoxypolyethylene glycol (meth)acrylates and N-vinyl-2-pyrrolidone.

Examples of the ionic monomers include acids such as acrylic acid, methacrylic acid, vinylsulfonic acid, allylsulfonic acid, methallylsulfonic acid, styrenesulfonic acid, 2-acrylamido-2-phenylpropanesulfonic acid, 2-acrylamido-2-methylpropanesulfonic acid, their salts of sodium, potassium, lithium, calcium and magnesium, amines such as N,N-dimethylaminoethyl methacrylate, N,N-diethylaminoethyl methacrylate, N,N-dimethylaminoethyl acrylate, N,N-dimethylaminopropylmethacrylamide and N,N-dimethylaminopropylacrylamide, and their tertiary and quaternary salts. Dibasic acids such as maleic acid and fumaric acid are not preferable, because they impair the polymerization sometimes.

Examples of the lipophilic monomers include N-alkyl (meth)acrylamide derivatives such as N,N-di-n-propylacrylamide, N-n-butylacrylamide, N-n-hexylacrylamide, N-n-hexylmethacrylamide, N-n-octylacrylamide, N-n-octylmethacrylamide, N-t-octylacrylamide, N-dodecylacrylamide and N-n-dodecylmethacrylamide; N-(ω-glycidoxyalkyl)(meth) acrylamide derivatives such as N,N-diglycidylacrylamide, N,N-diglycidylmethacrylamide, N-(4-glycidoxybutyl) acrylamide, N-(4-glycidoxybutyl)-methacrylamide, N-(5-glycidoxypentyl)acrylamide and N-(6-glycidoxyhexyl) acrylamide; (meth)acrylate derivatives such as methyl (meth)acrylate, ethyl (meth)acrylate, butyl (meth)acrylate, lauryl (meth)acrylate, 2-ethylhexyl (meth)acrylate and glycidyl (meth)acrylate; olefins such as acrylonitrile, methacrylonitrile, vinyl acetate, vinyl chloride, vinylidene chloride, ethylene, propylene and butene; styrene, divinylbenzene, α-methylstyrene, butadiene and isoprene.

The amount of the unsaturated monomer to be used for the copolymerization depends upon the kinds and the combinations of unsaturated monomers used, and so it cannot be determined in a wholesale manner. Nevertheless, the amount of the unsaturated monomer is roughly in the range of 0 to 75% by weight for the hydrophilic monomers, 0 to 85% by weight for the ionic monomers, or 0 to 50% by weight for the lipophilic monomers.

Next, reference will be made to a process for preparing the high-molecular weight acrylamide polymer by polymerizing the above-mentioned monomers.

The polymerization is carried out by a radical polymerization, and in this case, the employment of an oxidation-reduction system polymerization initiator is essential. The oxidation-reduction system polymerization initiator comprises a combination of oxidizing agents and a reducing agent. Examples of the oxidizing agents include inorganic oxides such as persulfates, hydrogen peroxide and metal peroxides, and organic oxides such as hydroperoxides, dialkyl peroxides, diacyl peroxides, ketone peroxides, dialkylperoxy dicarbonates, peracids and peracid esters thereof. Furthermore, as the organic oxides, not only low-molecular weight compounds but also high-molecular weight compounds can be used.

Examples of the persulfates of the inorganic oxides include ammonium persulfate, potassium persulfate and sodium persulfate. As hydrogen peroxide, a usual and commercially available water-soluble article can be used. Examples of the metal peroxides include sodium peroxide, potassium peroxide, lithium peroxide, barium peroxide, nickel peroxide and zinc peroxide.

Examples of the hydroperoxides which are the organic oxides include t-butyl hydroperoxide, cumene hydroperoxide, 1-phenyl-2-methylpropyl-1-hydroperoxide, tetralin hydroperoxide and diisopropyl peroxycarbonate. Examples of the dialkyl peroxides include di-t-butyl peroxide, dicumyl peroxide and 2,5-dimethyl-2,5-di(t-butylperoxy)hexane. Examples of the diacyl peroxides include diacetyl peroxides, dipropionyl peroxide, dibutyryl peroxide, dioctanoyl peroxide, didecanoyl peroxide, dilauroyl peroxide, dibenzoyl peroxide and di-2,4-dichlorobenzoyl peroxide. Examples of the ketone peroxides include methyl ethyl ketone peroxide and cyclohexanone peroxide. Examples of the dialkylperoxy dicarbonates include dipropylperoxy dicarbonate, di-2-ethylhexylperoxy dicarbonate and di-2-ethoxyethylperoxy dicarbonate. Examples of the peracids and their esters include peracetic acid, perpivalic acid, perbenzoic acid, t-butyl peracetate, t-butyl perbutyrate, t-butyl perpivalate, t-butyl peroxy-2-ethylhexanoate, t-butyl peroxylaurate and t-butyl benzoate.

The high-molecular weight peroxide is a polymeric compound in which a plurality of active oxygen groups having the above-mentioned structure are present in its molecule, and it can be prepared in accordance with the preparation procedure of the above-mentioned peroxide by suitably selecting raw materials, synthetic conditions and the like. For example, Japanese Patent Application Laid-open Nos. 40361/1990 and 40362/1990 disclose diacyl type polymeric peroxides, and Japanese Patent Application Laid-open No. 170808/1993 discloses polymeric peroxy dicarbonates.

On the other hand, examples of the reducing agent which can be used in combination with the above-mentioned oxidizing agents include salts of transition metal ions having low valences, sulfur oxides having low valences, organic amines and reducing sugars. Examples of the salts of the transition metal ions having low valences include water-soluble salts of iron (divalent), copper (monovalent), cobalt (divalent and trivalent), manganese (divalent) and the like, and their typical examples include ammonium ferrous sulfate, cuprous chloride and cobalt chloride (divalent). Examples of the sulfur oxides having low valences include sulfites, hydrogensulfites, pyrosulfites and sulfoxylates, and in general, their alkaline metal salts of $Na^+$, $K^+$ and the like and their ammonium salts are used from the viewpoint of solubility. As the organic amines, there can be used both aliphatic amines and aromatic amines, and the aliphatic amines preferably have low volatility and examples of the aliphatic amines include ethylenediamine, N,N-dimethylaminopropylamine and N,N,N',N'-tetramethylethylenediamine. Examples of the aromatic amines include aniline, N,N-dimethylaniline, benzylamine and N,N-dimethylbenzylamine. Examples of the reducing sugars and the similar substances thereof include monosaccharides such as aldose and ketose, disaccharides such as saccharose, maltose and lactose, and similar substances such as ascorbic acids.

In the polymerization of the acrylamide monomer, the polymerization system gels, so that the removal of polymerization heat is difficult. Therefore, after the initiation of the polymerization, the system is usually allowed to stand. Accordingly, the polymerization insulatingly proceeds, so that the temperature of the polymerization system rises from about 0° C. to about 100° C. In order to promptly advance the polymerization in such a wide temperature range, it is preferable that the aforesaid polymerization initiators are successfully combined or another additional initiator is used together with the polymerization initiator. As such another initiator which can be used together with the oxidation-reduction system polymerization initiator, various kinds of initiators are usable as the third components, and for example, azo initiators can be used. Above all, preferable are the initiators which are effective for the initiation of the polymerization at intermediate temperatures and high temperatures. Examples of the other initiators include azobis(2-amidinopropane) dihydrochloride, azobis(2-methylbutyronitrile), azobisisobutyronitrile, azobis(4-cyanovaleric acid), dimethyl azobisisobutyrate, azobis[2-(2-imidazoline-2-yl)propane] dihydrochloride, azobisisobutylamide and azobis[2-(hydroxymethyl)-propionitrile].

In the present invention, the acrylamide monomer is polymerized by the use of the above-mentioned polymerization initiator. At this time, a polymerization solvent is used, and as this solvent, water is most preferable. As water, industrial water is directly used, but preferable are ion-exchanged water, distilled water and well water containing less impurities such as metallic ions. A polar solvent which is miscible with water can also be used together with water, and examples of the polar solvent include lower alcohols such as methanol and ethanol, acetone, tetrahydrofuran, dioxane, dimethylformamide and N-methylpyrrolidone. These solvents can be conveniently used as a solvent for the polymerization initiator which is sparingly soluble in water.

In the present invention, the polymerization is carried out by the use of the above-mentioned polymerization solvent, and the concentration of the monomer is in the range of 2 to 70% by weight, preferably 5 to 50% by weight. The amount of the polymerization initiator to be used is in the range of $1 \times 10^{-4}$ to 0.5 mol %, preferably $1 \times 10^{-4}$ to 0.1 mol % in terms of the total amount of the oxidizing agents based on the weight of the monomer, and the relative ratio of each oxidizing agent in the combination of oxidizing agents is in the range of 1:50 to 50:1. If this relative ratio is less or more than the above-mentioned range, a synergistic effect obtained by the use of the plural oxidizing agents is decreased. In addition, a combination of different kinds of oxidizing agents can often exert a more excellent effect than a combination of the same kinds of oxidizing agents. Examples of the preferable combination include a persulfate and hydrogen peroxide, the persulfate and a hydroperoxide, the persulfate and a dialkyl peroxide, the persulfate and a diacyl peroxide, the persulfate and a ketone peroxide, the persulfate and a dialkylperoxy dicarbonate, the persulfate and a peracid, the persulfate and a peracid ester, the persulfate and a polymeric oxide, hydrogen peroxide and the hydroperoxide, hydrogen peroxide and the dialkyl peroxide, hydrogen peroxide and the diacyl peroxide, hydrogen peroxide and the ketone peroxide, hydrogen peroxide and the dialkylperoxy dicarbonate, hydrogen peroxide and the peracid, hydrogen peroxide and the peracid ester, hydrogen peroxide and the polymeric oxide, the hydroperoxide and the dialkyl peroxide, the hydroperoxide and the diacyl peroxide, the hydroperoxide and the ketone peroxide, the hydroperoxide and the dialkylperoxy dicarbonate, the hydroperoxide and the peracid, the hydroperoxide and the peracid ester, the hydroperoxide and the polymeric oxide, the dialkyl peroxide and the diacyl peroxide, the dialkyl peroxide and the ketone peroxide, the dialkyl peroxide and the dialkylperoxy dicarbonate, the dialkyl peroxide and the peracid, the dialkyl peroxide and the peracid ester, the dialkyl peroxide and the polymeric oxide, the diacyl peroxide and the ketone peroxide, the diacyl peroxide and the dialkylperoxy dicarbonate, the diacyl peroxide and the peracid, the diacyl peroxide and the peracid ester, the diacyl peroxide and the polymeric oxide, the ketone peroxide and the dialkylperoxy dicarbonate, the ketone peroxide and the peracid, the ketone peroxide and the peracid ester, the ketone peroxide and the polymeric oxide, the dialkylperoxy dicarbonate and the peracid, the dialkylperoxy dicarbonate and the peracid ester, the dialkylperoxy dicarbonate and the polymeric oxide, the peracid and the polymeric oxide, and the peracid ester and the polymeric oxide.

In addition, three or more kinds of oxidizing agents can be used together.

On the other hand, the reducing agent can be selected from the above-mentioned examples. When the polymerization is initiated at a low temperature of about 0° C., a salt of a transition metal ion having a low valence can be used to promptly initiate the polymerization. Anyway, the employment of the above-mentioned reducing agent permits the initiation of the polymerization at 40° C. or less. The ratio of the reducing agent to the oxidizing agents is in the range of 0.01 to 10 mols, preferably 0.02 to 5 mols per mol of the oxidizing agents.

The azo polymerization initiator which is the third component is not always essential, but the employment of the azo polymerization initiator together with the above-mentioned agents enables the polymerization to conveniently proceed with a good repeatability. The amount of the azo polymerization initiator to be added is in the range of $1 \times 10^{-3}$ to 5 mol %, preferably $1 \times 10^{-3}$ to 1 mol % based on monomers. The azo polymerization initiator can be used in an optional manner, and for example, it may be previously added to the aqueous solution of the monomer or may be added simultaneously with the addition of the oxidation-reduction system polymerization initiator.

No particular restriction is put on the pH of the reaction system at the time of the initiation of the polymerization, but it is roughly in the range of pH 3 to 10.

The initiation temperature of the polymerization depends upon the combination of the oxidizing agents and the reducing agent, and the concentrations and the ratio of these agents, but it is roughly in the range of −10° to 40° C. After the initiation of the polymerization, the temperature of the polymerization system rises by polymerization heat generated with the progress of the polymerization. When the concentration of the polymerization product is low and so stirring is possible, the temperature of a polymerization solution can be set to a desired level, but under usual conditions, the polymerization solution often gels with the progress of the polymerization. In such a case, the control of the temperature is difficult, and thus the polymerization solution is usually allowed to stand as the temperature rises. The maximum arrival temperature of the polymerization solution can be substantially determined by polymerization initiation temperature and monomer concentration, and polymerization conditions are so set that the maximum temperature may be in the range of 50° to 110° C. Moreover, polymerization time depends upon the kind of monomer, but it is roughly in the range of 1 to 100 hours.

Furthermore, the atmosphere of the polymerization system at the initiation of the polymerization may be air which contains oxygen, but in order to promptly carry out the polymerization with good repeatability, it is preferable to expel oxygen with an inert gas such as nitrogen gas. Not only the gas in a polymerization container but also oxygen dissolved in an aqueous acrylamide monomer solution and an aqueous initiator solution is preferably expelled.

More specifically, the dissolved oxygen-free aqueous acrylamide monomer solution is poured into the polymerization container from which oxygen has previously been removed, and the initiation temperature of the polymerization is then set. Afterward, a predetermined amount of the aqueous initiator solution from which oxygen has previously been removed is added with stirring to initiate the polymerization. During this operation, an inert gas such as nitrogen gas is preferably introduced into the polymerization container so as to prevent air from getting into the solution.

The temperature of the polymerization solution rises with the progress of the polymerization, but the solution is allowed to stand until a maximum temperature has been reached. After the arrival of the maximum temperature, the polymerization solution may be allowed to stand as this temperature is, if necessary, or the container may be subjected to a heat treatment such as immersion in hot water, thereby obtaining an acrylamide polymer.

Alternatively, the aqueous acrylamide monomer solution may be mixed with the aqueous polymerization initiator solution in a continuous flow system by the use of a static mixer or the like to initiate the polymerization. In this case, the mixing can be carried out continuously while the solution is flowing, and so a mechanical stirrer is not always necessary in the polymerization container. For example, the above-mentioned mixed solution may be poured into a container such as a drum, and then allowed to stand as the polymerization proceeds, whereby the polymerization can be performed.

Furthermore, there can also be used a polymerization apparatus which is designed so as to carry out pouring a mixture of the aqueous monomer solution and the polymerization initiator into one end of a transport device such as a belt conveyor, moving the belt conveyor in line with the progress of the polymerization, and then discharging the obtained acrylamide polymer from the other end of the belt conveyor.

The thus obtained polymer has a high molecular weight, and so, after the polymerization, the solution is in a paste state having a very high viscosity or in a gel state having no fluidity. In the case of the paste state, the solution can be transferred by a pump, and therefore it can be directly handled as a product. On the other hand, in the case of the gel state, time is required to dissolve it, and therefore when the polymer is used in the state of an aqueous solution as a paper strength agent, it is necessary that the polymer should be diluted with water and kept in the state of an aqueous solution. In order to obtain a powdery solid product, there can be used a method in which the acrylamide polymer is immersed in an organic solvent such as methanol which does not dissolve it, whereby the polymer is dehydrated, or a method in which the polymer gel is shredded by a shredder such as a meat mincer, dried at 50° to 150° C., and then further ground to obtain a powder. As a drying machine, there can be used a hot air fan type drier, a cylindrical drier, an infrared drier or a high-frequency drier. If a quality deterioration such as insolubilization by the drying is extremely undesirable, a freezing drier or the like can be used.

The polymer dried by the above-mentioned procedure is ground to obtain a powdery product, and as a grinding technique, a dry method is preferable. As a grinder, there can be used a roll crusher, a Dodge crusher, a hammer mill, a rotary crusher, a ball mill, a rod mill, a roller mill, a pin mill, a micronizer or the like.

The acrylamide polymer prepared by the above-mentioned process has a weight-average molecular weight of 2,000,000 to 20,000,000, and it is useful for a flocculant, an agent for enhanced oil recovery (EOR) or a papermaking chemicals (a paper strength agent, a drainage agent or a retention aid).

In order to make the thus prepared acrylamide polymer having the very high molecular weight applicable to various uses, the polymer must be naturally water-soluble enough to obtain an aqueous solution. Therefore, it is a point for good quality how water insolubles are reduced as much as possible, and various solubility test methods have been developed. The simplest method comprises adding the polymer to distilled water so that the concentration of the polymer may be about 0.1%, stirring the solution for a predetermined time to dissolve it therein, filtering the solution through a filter cloth or a metal screen to collect insolubles, and then determining the amount of the same. Another solubility test method is adding water-soluble salts to water and solubilities are tested at various salt concentrations.

The molecular weight of the acrylamide polymer can be obtained by a column fractionation method such as gel permeation chromatography, or by measuring an intrinsic viscosity and then deciding the molecular weight from a conversion formula between the intrinsic viscosity and the molecular weight.

Next, the present invention will be described in detail with reference to examples and comparative examples, but the scope of the present invention should not be limited to these examples.

EXAMPLE 1

Preparation of acrylamide polymer:

650 g of distilled water and 20 g ($2.9 \times 10^{-2}$ mol % based on a monomer) of a 2.06 wt % aqueous 2,2-azobis(2-amidinopropane) dihydrochloride (hereinafter abbreviated to "V-50") solution were added to 750 g of a 50 wt % aqueous acrylamide solution, and 26.9 mg ($1.5 \times 10^{-4}$ mol % based on the monomer) of a 1 wt % hydrogen peroxide was further added. Next, the pH of the solution was adjusted to 7.0 with an aqueous sodium hydroxide solution, thereby preparing an aqueous acrylamide solution. The temperature of the aqueous acrylamide solution was adjusted to a polymerization initiation temperature (0° C.) or less, and the solution was then transferred to a 2-liter thermos bottle. Next, a nitrogen introduction tube and a thermometer were attached to the bottle, and this bottle was then plugged with a silicon rubber provided with an exhaust vent and a catalyst addition orifice. Afterward, a nitrogen gas was introduced into the bottle at 850 ml/min for 1 hour to remove dissolved oxygen from the solution.

Next, after the temperature of the solution had reached 0° C., 40 g ($3.0 \times 10^{-4}$ mol % based on the monomer) of a $9.0 \times 10^{-3}$ wt % aqueous ammonium persulfate (hereinafter abbreviated to "APS") solution and 40 g ($1.5 \times 10^{-4}$ mol % based on the monomer) of a $7.8 \times 10^{-3}$ wt % ammonium ferrous sulfate (hereinafter abbreviated to "FAS") were simultaneously and promptly poured into the solution, followed by stirring to initiate polymerization. Afterward, the nitrogen introduction tube was pulled up from the surface of the solution, and the solution was allowed to stand, keeping a nitrogen atmosphere in the upper portion of the reaction container, whereby linsulating polymerization was carried out. After the polymerization temperature had reached a maximum point, the solution was further allowed to stand for 1 hour. At this time, the maximum temperature and the time until the maximum temperature had been reached (a polymerization time) were measured. The results are shown in Table 1.

The thus obtained acrylamide polymer was cut by a scissors to remove its peripheral portion therefrom, and the polymer was shredded, finely minced by a meat mincer, dried with hot air at 85° C. for 110 minutes, ground for 1 minute by a high-speed rotary blade type grinder, and then sieved to collect a powder of 20 to 60 mesh, thereby obtaining a dry powdery acrylamide polymer sample. The thus obtained acrylamide polymer sample was used for the following test, and the results are shown in Table 1. The moisture content of every dry powdery acrylamide polymer sample was about 10 wt %.

Solubility test of acrylamide polymer:

400 g of distilled water was poured into a 500-ml beaker, and 0.44 g (pure content=about 0.4 g) of the acrylamide polymer was added thereto, while screw type blades were rotated at 200 rpm, followed by stirring for 90 minutes to dissolve it. The resultant solution was filtered through a 150 mesh stainless steel screen, and insolubles were then visually observed. In this case, the estimation of the insolubles was made in accordance with the following ranking:

○: Any insolubles were not present.

Δ: A small amount of the insolubles was present.

X: A large amount of the insolubles was present.

Measurement of molecular weight of acrylamide polymer:

The weight-average molecular weight of the acrylamide polymer was measured by subjecting, to gel permeation chromatography, a filtrate obtained in the above-mentioned solubility test.

EXAMPLES 2 TO 8

Each acrylamide polymer was prepared by the same procedure as in Example 1 except that an oxidizing agent added at the formation of a polymerization solution, the amount of an oxidation-reduction system polymerization initiator used at the initiation of the polymerization and the initiation temperature of the polymerization were as shown in Table 1. At this time, a maximum temperature and a polymerization time were measured. Afterward, the same operation as in Example 1 was carried out to obtain dry powdery acrylamide polymer samples. For each of the thus obtained acrylamide polymer samples, a solubility test was made and its molecular weight was measured to evaluate the performance of the sample, as in Example 1. The results are shown in Table 1.

EXAMPLE 9

An acrylamide polymer was prepared by the same procedure as in Example 1 except that 20 g of a 1.26 wt % azobisisobutylonitrile-methanol solution was added in place of 20 g of a 2.06 wt % aqueous V-50 solution. At this time, a maximum temperature and a polymerization time were measured. The results are shown in Table 1. Next, the same operation as in Example 1 was carried out to obtain a dry powdery acrylamide polymer sample. For the thus obtained acrylamide polymer sample, a solubility test was made and its molecular weight was measured to evaluate the performance of the sample, as in Example 1. The results are shown in Table 1.

EXAMPLE 10

An acrylamide polymer was prepared by the same procedure as in Example 1 except that 20 g of water was added in place of 20 g of a 2.06 wt % aqueous V-50 solution. At this time, a maximum temperature and a polymerization time were measured. The results are shown in Table 1. Next, the same operation as in Example 1 was carried out to obtain a dry powdery acrylamide polymer sample. For the thus obtained acrylamide polymer sample, a solubility test was made and its molecular weight was measured to evaluate the performance of the sample, as in Example 1. The results are shown in Table 1.

COMPARATIVE EXAMPLE 1

An acrylamide polymer was prepared by all the same procedure as in Example 1 except that hydrogen peroxide was not added. At this time, a maximum temperature and a polymerization time were measured. Afterward, the same operation as in Example 1 was carried out to obtain a dry powdery acrylamide polymer sample. For the thus obtained acrylamide polymer sample, a solubility test was made and its molecular weight was measured to evaluate the performance of the sample, as in Example 1. The results are shown in Table 1.

In this case, the molecular weight and the solubility of the polymer sample were about the same as in Example 1, but the polymerization time was longer, as compared with a short polymerization time in Example 1.

COMPARATIVE EXAMPLE 2

An acrylamide polymer was prepared by the same procedure as in Example 1 except that hydrogen peroxide and V-50 were not added. At this time, a maximum temperature and a polymerization time were measured. Afterward, the same operation as in Example 1 was carried out to obtain a dry powdery acrylamide polymer sample. For the thus obtained acrylamide polymer sample, a solubility test was made and its molecular weight was measured to evaluate the performance of the sample, as in Example 1. The results are shown in Table 1.

Also in this case, the molecular weight and the solubility of the polymer sample were about the same as in Example 1, but the polymerization time was much longer than in Example 1.

COMPARATIVE EXAMPLE 3

An acrylamide polymer was prepared by the same procedure as in Example 1 except that hydrogen peroxide was not added and APS and FAS which were oxidation-reduction system polymerization initiators were added so as to be $6.0 \times 10^{-4}$ mol % and $3.0 \times 10^{-4}$ mol %, respectively. At this time, a maximum temperature and a polymerization time were measured. Afterward, the same operation as in Example 1 was carried out to obtain a dry powdery acrylamide polymer sample. For the thus obtained acrylamide polymer sample, a solubility test was made and its molecular weight was measured to evaluate the performance of the sample, as in Example 1. The results are shown in Table 1.

In this case, the polymerization time was substantially equal to that of Example 1 by virtue of the increase of the polymerization initiators, but the molecular weight was much lower than in Example 1.

COMPARATIVE EXAMPLE 4

An acrylamide polymer was prepared by the same procedure as in Example 5 except that hydrogen peroxide was not added. At this time, a maximum temperature and a polymerization time were measured. Afterward, the same operation as in Example 1 was carried out to obtain a dry powdery acrylamide polymer sample. For the thus obtained acrylamide polymer sample, a solubility test was made and its molecular weight was measured to evaluate the performance of the sample, as in Example 1. The results are shown in Table 1.

In this case, the molecular weight and the solubility of the polymer sample were about the same as in Example 5, but the polymerization time was much longer than in Example 5.

COMPARATIVE EXAMPLE 5

An acrylamide polymer was prepared by the same procedure as in Example 7 except that hydrogen peroxide was not added. At this time, a maximum temperature and a polymerization time were measured. Afterward, the same operation as in Example 1 was carried out to obtain a dry powdery acrylamide polymer sample. For the thus obtained acrylamide polymer sample, a solubility test was made and its molecular weight was measured to evaluate the performance of the sample, as in Example 1. The results are shown in Table 1.

In this case, the molecular weight and the solubility of the polymer sample were about the same as in Example 7, but the polymerization time was much longer than in Example 7.

TABLE 1

Polymerization initiator (mol % based on monomer)
Upper Item: Oxidizing agent [Azo polymerization initiator]
Lower Item: Oxidation-reduction system polymerization initiator

| Example 1 | Hydrogen peroxide $(1.5 \times 10^{-4})$, [V-50 $(2.9 \times 10^{-2})$] APS $(3.0 \times 10^{-4})$/FAS $(1.5 \times 10^{-4})$ |
|---|---|
| Example 2 | Hydrogen peroxide $(1.5 \times 10^{-4})$, [V-50 $(2.9 \times 10^{-2})$] APS $(3.0 \times 10^{-4})$/FAS $(1.5 \times 10^{-4})$ |
| Example 3 | t-butyl hydroperoxide $(4.2 \times 10^{-4})$, [V-50 $(2.9 \times 10^{-2})$] APS $(3.0 \times 10^{-4})$/FAS $(1.5 \times 10^{-4})$ |
| Example 4 | Hydrogen peroxide $(1.5 \times 10^{-4})$, [V-50 $(2.9 \times 10^{-2})$] Potassium persulfate $(3.0 \times 10^{-4})$/FAS $(1.5 \times 10^{-4})$ |
| Example 5 | Hydrogen peroxide $(5.0 \times 10^{-4})$, [V-50 $(2.9 \times 10^{-2})$] APS $(10.0 \times 10^{-4})$/Sodium hydrogensulfite $(5.0 \times 10^{-4})$ |
| Example 6 | t-butyl hydroperoxide $(14.0 \times 10^{-4})$, [V-50 $(2.9 \times 10^{-2})$] APS $(10.0 \times 10^{-4})$/Sodium hydrogensulfite $(5.0 \times 10^{-4})$ |
| Example 7 | Hydrogen peroxide $(2.5 \times 10^{-3})$, [V-50 $(2.9 \times 10^{-2})$] APS $(5.0 \times 10^{-3})$/Tetramethylethylenediamine $(2.5 \times 10^{-3})$ |
| Example 8 | t-butyl hydroperoxide $(6.6 \times 10^{-3})$, [V-50 $(2.9 \times 10^{-2})$] APS $(5.0 \times 10^{-3})$/Tetramethylethylenediamine $(2.5 \times 10^{-3})$ |
| Example 9 | Hydrogen peroxide $(1.5 \times 10^{-4})$, [Azobisisobutylonitrile $(2.9 \times 10^{-2})$] APS $(3.0 \times 10^{-4})$/FAS $(1.5 \times 10^{-4})$ |
| Example 10 | Hydrogen peroxide $(1.5 \times 10^{-4})$, APS $(3.0 \times 10^{-4})$/FAS $(1.5 \times 10^{-4})$ |
| Comparative Example 1 | [V-50 $(2.9 \times 10^{-2})$] APS $(3.0 \times 10^{-4})$/FAS $(1.5 \times 10^{-4})$ |
| Comparative Example 2 | [—] APS $(3.0 \times 10^{-4})$/FAS $(1.5 \times 10^{-4})$ |
| Comparative Example 3 | [V-50 $(2.9 \times 10^{-2})$] APS $(6.0 \times 10^{-4})$/FAS $(3.0 \times 10^{-4})$ |
| Comparative Example 4 | [V-50 $(2.9 \times 10^{-2})$] |

TABLE 1-continued

| Example 4 | APS $(10.0 \times 10^{-4})$/Sodium hydrogensulfite $(5.0 \times 10^{-4})$ |
|---|---|
| Comparative Example 5 | [V-50 $(2.9 \times 10^{-2})$] APS $(5.0 \times 10^{-3})$/Tetramethylethylenediamine $(2.5 \times 10^{-3})$ |

*In every example, a polymerization ratio was 99% or more.

| | Initiation Temp. (°C.) | Max. Temp. (°C.) | Polymerization Time (min) | Solubility | Molecular Weight ($\times 10^4$) |
|---|---|---|---|---|---|
| Example 1 | 0 | 75 | 89 | ○ | 1650 |
| Example 2 | 10 | 85.5 | 75 | ○ | 1500 |
| Example 3 | 0 | 76 | 77 | ○ | 1630 |
| Example 4 | 0 | 75 | 98 | ○ | 1610 |
| Example 5 | 10 | 86 | 121 | ○ | 1500 |
| Example 6 | 10 | 86.5 | 105 | ○ | 1490 |
| Example 7 | 10 | 86 | 117 | ○ | 1510 |
| Example 8 | 10 | 87 | 101 | ○ | 1480 |
| Example 9 | 0 | 76 | 90 | ○ | 1600 |
| Example 10 | 0 | 75.5 | 91 | ○ | 1620 |
| Comparative Example 1 | 0 | 76 | 102 | ○ | 1600 |
| Comparative Example 2 | 0 | 76 | 119 | ○ | 1650 |
| Comparative Example 3 | 0 | 76.5 | 93 | ○ | 1080 |
| Comparative Example 4 | 10 | 86 | 138 | ○ | 1520 |
| Comparative Example 5 | 0 | 87 | 163 | ○ | 1510 |

EXAMPLE 11

Preparation of acrylamide polymer comprising acrylamide-acrylic acid:

800 g of distilled water and 20 g of a 2.05 wt % aqueous V-50 solution were added to 450 g of a 50 wt % aqueous acrylamide solution and 150 g of acrylic acid, and hydrogen peroxide was further added so as to be $2.5 \times 10^{-4}$ mol % based on the monomers. Next, the pH of the solution was adjusted to 7.0 with an aqueous sodium hydroxide solution, thereby preparing an aqueous acrylamide solution. The temperature of the aqueous acrylamide solution was adjusted to a polymerization initiation temperature (0° C.) or less, and the solution was then transferred to a 2-liter thermos bottle. Next, a nitrogen introduction tube and a thermometer were attached to the bottle, and this bottle was then plugged with a silicon rubber provided with an exhaust vent and a catalyst addition orifice. Afterward, a nitrogen gas was introduced into the bottle at 850 ml/min for 1 hour to remove dissolved oxygen from the solution.

Next, after the temperature of the solution had reached 0° C., 40 g ($3.0 \times 10^{-4}$ mol % based on the monomers) of a $9.0 \times 10^{-3}$ wt % aqueous APS solution and 40 g ($1.5 \times 10^{-4}$ mol % based on the monomers) of a $7.7 \times 10^{-3}$ wt % aqueous FAS solution were simultaneously and promptly poured to the solution, followed by stirring to initiate polymerization. Afterward, the nitrogen introduction tube was pulled up from the surface of the solution, and the solution was allowed to stand, keeping a nitrogen atmosphere in the upper portion of the reaction container, whereby insulating polymerization was carried out. After polymerization temperature had reached a maximum point, the solution was further allowed to stand for 1 hour. At this time, the maximum temperature and a polymerization time were measured. The results are shown in Table 2. Afterward, all the same operation as in Example 1 was carried out, and tests of performance evaluation were then made. The results are shown in Table 2.

EXAMPLES 12 TO 18

Each acrylamide polymer was prepared by the same procedure as in Example 11 except that an oxidizing agent added at the formation of a polymerization solution, the amount of an oxidation-reduction system polymerization initiator used at the initiation of the polymerization and the initiation temperature of the polymerization were as shown in Table 2. At this time, a maximum temperature and a polymerization time were measured. Afterward, the same operation as in Example 1 was carried out to obtain dry powdery acrylamide polymer samples. For each of the thus obtained acrylamide polymer samples, a solubility test was made and its molecular weight was measured to evaluate the performance of the sample, as in Example 1. The results are shown in Table 2.

EXAMPLE 19

An acrylamide polymer was prepared by the same procedure as in Example 11 except that 20 g of water was added in place of 20 g of a 2.05 wt % aqueous V-50 solution. At this time, a maximum temperature and a polymerization time were measured. The results are shown in Table 2. Next, the same operation as in Example 1 was carried out to obtain a dry powdery acrylamide polymer sample. For the thus obtained acrylamide polymer sample, a solubility test was made and its molecular weight was measured to evaluate the performance of the sample, as in Example 1. The results are shown in Table 2.

COMPARATIVE EXAMPLE 6

An acrylamide polymer was prepared by the same procedure as in Example 11 except that hydrogen peroxide was not added. At this time, a maximum temperature and a polymerization time were measured. Afterward, the same operation as in Example 1 was carried out to obtain a dry powdery acrylamide polymer sample. For the thus obtained acrylamide polymer sample, a solubility test was made and its molecular weight was measured to evaluate the performance of the sample, as in Example 1. The results are shown in Table 2.

In this case, the molecular weight and the solubility of the polymer sample were about the same as in Example 11, but the polymerization time was much longer, as compared with a short polymerization time in Example 11.

TABLE 2

Polymerization initiator (mol % based on monomer)
Upper Item: Oxidizing agent [Azo polymerization initiator]
Lower Item: Oxidation-reduction system polymerization initiator

| | |
|---|---|
| Example 11 | Hydrogen peroxide ($2.5 \times 10^{-4}$), [V-50 ($2.9 \times 10^{-2}$)] APS ($3.0 \times 10^{-4}$)/FAS ($1.5 \times 10^{-4}$) |
| Example 12 | t-butyl hydroperoxide ($7.0 \times 10^{-4}$), [V-50 ($2.9 \times 10^{-2}$)] APS ($3.0 \times 10^{-4}$)/FAS ($1.5 \times 10^{-4}$) |
| Example 13 | Cumen hydroperoxide ($11.9 \times 10^{-4}$), [V-50 ($2.9 \times 10^{-2}$)] APS ($3.0 \times 10^{-4}$)/FAS ($1.5 \times 10^{-4}$) |
| Example 14 | t-butyl peroxyoctoate ($16.9 \times 10^{-4}$), [V-50 ($2.9 \times 10^{-2}$)] APS ($3.0 \times 10^{-4}$)/FAS ($1.5 \times 10^{-4}$) |
| Example 15 | Hydrogen peroxide ($2.5 \times 10^{-4}$), [V-50 ($2.9 \times 10^{-2}$)] Potassium persulfate ($3.0 \times 10^{-4}$)/FAS ($1.5 \times 10^{-4}$) |
| Example 16 | Hydrogen peroxide ($8.3 \times 10^{-4}$), |

TABLE 2-continued

| | |
|---|---|
| | [V-50 ($2.9 \times 10^{-2}$)] APS ($10.0 \times 10^{-4}$)/Sodium hydrogensulfite ($5.0 \times 10^{-4}$) |
| Example 17 | t-butyl hydroperoxide ($23.3 \times 10^{-4}$), [V-50 ($2.9 \times 10^{-2}$)] APS ($10.0 \times 10^{-4}$)/Sodium hydrogensulfite ($5.0 \times 10^{-4}$) |
| Example 18 | Hydrogen peroxide ($4.2 \times 10^{-3}$), [V-50 ($2.9 \times 10^{-2}$)] APS ($5.0 \times 10^{-3}$)/Tetramethylethylenediamine ($2.5 \times 10^{-3}$) |
| Example 19 | Hydrogen peroxide ($2.5 \times 10^{-4}$), APS ($3.0 \times 10^{-4}$)/FAS ($1.5 \times 10^{-4}$) |
| Comparative Example 6 | [V-50 ($2.9 \times 10^{-2}$)] APS ($3.0 \times 10^{-4}$)/FAS ($1.5 \times 10^{-4}$) |

*In every example, a polymerization ratio was 99% or more.

| | Initiation Temp. (°C.) | Max. Temp. (°C.) | Polymerization Time (min) | Solubility | Molecular Weight ($\times 10^4$) |
|---|---|---|---|---|---|
| Example 11 | 0 | 83 | 90 | ◯ | 1740 |
| Example 12 | 0 | 83 | 81 | ◯ | 1760 |
| Example 13 | 0 | 83 | 82 | ◯ | 1730 |
| Example 14 | 0 | 84 | 82 | ◯ | 1740 |
| Example 15 | 0 | 84 | 92 | ◯ | 1720 |
| Example 16 | 10 | 92 | 108 | ◯ | 1630 |
| Example 17 | 10 | 91 | 91 | ◯ | 1650 |
| Example 18 | 10 | 92 | 115 | ◯ | 1630 |
| Example 19 | 0 | 83 | 92 | ◯ | 1740 |
| Comparative Example 6 | 0 | 82 | 181 | ◯ | 1730 |

EXAMPLE 20

Preparation of acrylamide polymer comprising acrylamidemethacryloyloxyethyltrimethylammonium chloride:

800 g of distilled water and 20 g of a 1.56 wt % aqueous V-50 solution were added to 450 g of a 50 wt % aqueous acrylamide solution and 150 g of methacryloyloxyethyltrimethylammonium chloride, and hydrogen peroxide was further added so as to be $2.5 \times 10^{-4}$ mol % based on the monomers. Next, the pH of the solution was adjusted to 4.5 with an aqueous sulfuric acid solution, thereby preparing an aqueous acrylamide solution. The temperature of the aqueous acrylamide solution was adjusted to a polymerization initiation temperature (0° C.) or less, and the solution was then transferred to a 2-liter thermos bottle. Next, a nitrogen introduction tube and a thermometer were attached to the bottle, and this bottle was then plugged with a silicon rubber provided with an exhaust vent and a catalyst addition orifice. Afterward, a nitrogen gas was introduced into the bottle at 850 ml/min for 1 hour to remove dissolved oxygen from the solution.

Next, after the temperature of the solution had reached 0° C., 40 g ($3.0 \times 10^{-4}$ mol % based on the monomers) of a $6.8 \times 10^{-3}$ wt % aqueous APS solution and 40 g ($1.5 \times 10^{-4}$ mol % based on the monomers) of a $5.8 \times 10^{-3}$ wt % aqueous FAS solution were simultaneously and promptly poured to the solution, followed by stirring to initiate polymerization. Afterward, the nitrogen introduction tube was pulled up from the surface of the solution, and the solution was allowed to stand, keeping a nitrogen atmosphere in the upper portion of the reaction container, whereby insulating polymerization was carried out. After polymerization temperature had reached a maximum point, the solution was further allowed to stand for 1 hour. At this time, the maximum temperature and a polymerization time were measured. The results are shown in Table 3. Afterward, the same operation as in Example 1 was carried out, and tests of performance evaluation were then made. The results are shown in Table 3.

EXAMPLES 21 TO 23

Each acrylamide polymer was prepared by the same procedure as in Example 20 except that an oxidizing agent added at the formation of a polymerization solution, the amount of an oxidation-reduction system polymerization initiator used at the initiation of the polymerization and the initiation temperature of the polymerization were as shown in Table 3. At this time, a maximum temperature and a polymerization time were measured. Afterward, the same operation as in Example 1 was carried out to obtain dry powdery acrylamide polymer samples. For each of the thus obtained acrylamide polymer samples, a solubility test was made and its molecular weight was measured to evaluate the performance of the sample, as in Example 1. The results are shown in Table 3.

EXAMPLE 24

An acrylamide polymer was prepared by the same procedure as in Example 20 except that 20 g of water was added in place of 20 g of a 1.56 wt % aqueous V-50 solution. At this time, a maximum temperature and a polymerization time were measured. The results are shown in Table 3. Next, the same operation as in Example 1 was carried out to obtain a dry powdery acrylamide polymer sample. For the thus obtained acrylamide polymer sample, a solubility test was made and its molecular weight was measured to evaluate the performance of the sample, as in Example 1. The results are shown in Table 3.

COMPARATIVE EXAMPLE 7

An acrylamide polymer was prepared by the same procedure as in Example 20 except that hydrogen peroxide was not added. At this time, a maximum temperature and a polymerization time were measured. Afterward, the same operation as in Example 1 was carried out to obtain a dry powdery acrylamide polymer sample. For the thus obtained acrylamide polymer sample, a solubility test was made and its molecular weight was measured to evaluate the performance of the sample, as in Example 1. The results are shown in Table 3.

In this case, the molecular weight and the solubility of the polymer sample were about the same as in Example 20, but the polymerization time was much longer, as compared with a short polymerization time in Example 20.

TABLE 3

Polymerization initiator (mol % based on monomer)
Upper Item: Oxidizing agent [Azo polymerization initiator]
Lower Item: Oxidation-reduction system polymerization initiator

| | |
|---|---|
| Example 20 | Hydrogen peroxide ($2.5 \times 10^{-4}$), [V-50 ($2.9 \times 10^{-2}$)] APS ($3.0 \times 10^{-4}$)/FAS ($1.5 \times 10^{-4}$) |
| Example 21 | t-butyl hydroperoxide ($7.0 \times 10^{-4}$), [V-50 ($2.9 \times 10^{-2}$)] APS ($3.0 \times 10^{-4}$)/FAS ($1.5 \times 10^{-4}$) |
| Example 22 | Hydrogen peroxide ($2.5 \times 10^{-4}$), [V-50 ($2.9 \times 10^{-2}$)] Potassium persulfate ($3.0 \times 10^{-4}$)/ FAS ($1.5 \times 10^{-4}$) |
| Example 23 | Hydrogen peroxide ($4.2 \times 10^{-3}$), [V-50 ($2.9 \times 10^{-2}$)] |

TABLE 3-continued

| | |
|---|---|
| | APS ($5.0 \times 10^{-3}$)/ Tetramethylethylenediamine ($2.5 \times 10^{-3}$) |
| Example 24 | Hydrogen peroxide ($2.5 \times 10^{-4}$), APS ($3.0 \times 10^{-4}$)/FAS ($1.5 \times 10^{-4}$) |
| Example 25 | Methyl ethyl ketone peroxide ($8.0 \times 10^{-4}$), [V-50 ($2.9 \times 10^{-2}$)] APS ($3.0 \times 10^{-4}$)/FAS ($1.5 \times 10^{-4}$) |
| Comparative Example 7 | [V-50 ($2.9 \times 10^{-2}$)] APS ($3.0 \times 10^{-4}$)/FAS ($1.5 \times 10^{-4}$) |

*In every example, a polymerization ratio was 99% or more.

| | Initiation Temp. (°C.) | Max. Temp. (°C.) | Polymernation Time (min) | Solubility | Molecular Weight (×10$^4$) |
|---|---|---|---|---|---|
| Example 20 | 0 | 82 | 121 | ○ | 1390 |
| Example 21 | 0 | 82 | 113 | ○ | 1380 |
| Example 22 | 0 | 82 | 128 | ○ | 1350 |
| Example 23 | 10 | 90 | 135 | ○ | 1410 |
| Example 24 | 0 | 81 | 129 | ○ | 1390 |
| Example 25 | 0 | 82 | 110 | ○ | 1330 |
| Comparative Example 7 | 10 | 88 | 195 | ○ | 1380 |

COMPARATIVE EXAMPLE 8

800 g of distilled water and 20 g of a 1.74 wt % aqueous V-50 solution were added to 450 g of a 50 wt % aqueous acrylamide solution and 150 g of fumaric acid, and hydrogen peroxide was further added so as to be $2.5 \times 10^{-4}$ mol % based on the monomers. Next, the pH of the solution was adjusted to 4.5 with an aqueous sodium hydroxide solution, thereby preparing an aqueous acrylamide solution. The temperature of the aqueous acrylamide solution was adjusted to a polymerization initiation temperature (0° C.) or less, and the solution was then transferred to a 2-liter thermos bottle. Next, a nitrogen introduction tube and a thermometer were attached to the bottle, and this bottle was then plugged with a silicon rubber provided with an exhaust vent and a catalyst addition orifice. Afterward, a nitrogen gas was introduced into the bottle at 850 ml/min for 1 hour to remove dissolved oxygen from the solution.

Next, after the temperature of the solution had reached 0° C., 40 g ($3.0 \times 10^{-4}$ mol % based on the monomers) of a $7.6 \times 10^{-3}$ wt % aqueous APS solution and 40 g ($1.5 \times 10^{-4}$ mol % based on the monomers) of a $6.5 \times 10^{-3}$ wt % aqueous FAS solution were simultaneously and promptly poured to the solution to initiate polymerization. However, reaction temperature scarcely rose, and the temperature rise was only 4° C. in 5 hours. The reaction solution became slightly viscous, but the reaction scarcely proceeded. Even when maleic acid was added in place of fumaric acid, similar results were seen.

Effects of the present invention:

In general, the polymerization time can be shortened with an increase in the polymerization initiator, but on the contrary, the molecular weight of an obtained polymer decreases with the increase of the polymerization initiator.

In the polymerization by an oxidation-reduction system polymerization initiator of the present invention, a process using two or more kinds of oxidizing agents together is used, so that the polymerization time can be remarkably shortened to about ¼ to ¾ of a polymerization time in the case that an oxidizing agent is singly used. This phenomenon is utterly different from results which can be presumed from a general theory, and the polymerization can be carried out without deteriorating the solubility and the molecular weight of the obtained polymer. Furthermore, since the concentration of the polymerization initiator is not extremely low, the residue of unreacted monomer is very small, and the repeatability of the polymerization is good and the polymerization time becomes substantially constant. Thus, according to the present invention, the residue of the unreacted monomer can be remarkably decreased, and the polarization can be carried out with good repeatability and the polymerization time can be shortened without deteriorating the performance of the high-molecular weight acrylamide polymer. Hence, restriction on manufacturing facilities and apparatuses can be relieved, and productivity can be remarkably enhanced, which permits a decrease in manufacturing cost.

What is claimed is:

1. A process for preparing a high-molecular weight acrylamide polymer in a short period of time which comprises the step of polymerizing (meth)acrylamide or copolymerizing (meth)acrylamide and one or more unsaturated monomers copolymerizable with (meth)acrylamide in the presence of an oxidation-reduction system polymerization initiator comprising a reducing agent and two or more kinds of oxidizing agents selected from the group consisting of persulfates, hydrogen peroxide, metal peroxides, hydroperoxides, dialkyl peroxides, diacyl peroxides, ketone peroxides, dialkylperoxy dicarbonates, peracids and peracid esters, without decreasing molecular weight of the polymer.

2. The preparation process according to claim 1 wherein the obtained polymer is further shredded, dried, and then ground into powder.

3. The preparation process according to claim 1 wherein two or more kinds of oxidizing agents are a combination of a persulfate and hydrogen peroxide, a persulfate and a hydroperoxide, a persulfate and a dialkyl peroxide, a persulfate and a diacyl peroxide, a persulfate and a ketone peroxide, a persulfate and a dialkylperoxy dicarbonate, a persulfate and a peracid, a persulfate and a peracid ester, a persulfate and a polymeric oxide, hydrogen peroxide and a hydroperoxide, hydrogen peroxide and a dialkyl peroxide, hydrogen peroxide and a diacyl peroxide, hydrogen peroxide and a ketone peroxide, hydrogen peroxide and a dialkylperoxy dicarbonate, hydrogen peroxide and a peracid, hydrogen peroxide and a peracid ester, hydrogen peroxide and a polymeric oxide, a hydroperoxide and a dialkyl peroxide, a hydroperoxide and a diacyl peroxide, and a hydroperoxide and a ketone peroxide, a hydroperoxide and a dialkylperoxy dicarbonate, a hydroperoxide and a peracid, a hydroperoxide and a peracid ester, a hydroperoxide and a polymeric oxide, a dialkyl peroxide and a diacyl peroxide, a dialkyl peroxide and a ketone peroxide, a dialkyl peroxide and a dialkylperoxy dicarbonate, a dialkyl peroxide and a peracid, a dialkyl peroxide and a peracid ester, a diacyl peroxide and a polymeric oxide, a diacyl peroxide and a ketone peroxide, a diacyl peroxide and a dialkylperoxy dicarbonate, a diacyl peroxide and a peracid, a diacyl peroxide and a peracid ester, a diacyl peroxide and a polymeric oxide, a ketone peroxide and a dialkylperoxy dicarbonate, a ketone peroxide and a peracid, a ketone peroxide and a peracid ester, a ketone peroxide and a polymeric oxide, a dialkylperoxy dicarbonate and a peracid, a dialkylperoxy dicarbonate and a peracid ester, a dialkylperoxy dicarbonate and a polymeric oxide, a peracid and a polymeric oxide, or a peracid ester and a polymeric oxide.

4. The preparation process according to claim 3 wherein the obtained polymer is further shredded, dried, and then ground into powder.

5. The preparation process according to claim 1 wherein the reducing agent is selected from the group consisting of salts of transition metal ions having monovalence, divalence or trivalence, organic amines and reducing sugars.

6. The preparation process according to claim 5 wherein the obtained polymer is further shredded, dried, and then ground into powder.

7. The preparation process according to claim 1 wherein the amount of the polymerization initiator comprising a reducing agent and two or more kinds of oxidizing agents to be used is 1) in the range of $1 \times 10^4$ to 0.5 mol % in terms of the total oxidizing agents based on the monomer, and 2) the ratio of the reducing agent to the total oxidizing agents is in the range of 0.01 to 10 mols per mol of the oxidizing agents.

8. The preparation process according to claim 2 wherein the obtained polymer is further shredded, dried, and then ground into powder.

9. The preparation process according to claim 7 wherein an azo polymerization initiator is further added in an amount of $1 \times 10^{-3}$ to 5 mol % based on the monomer.

10. The preparation process according to claim 9 wherein the obtained polymer is further shredded, dried, and then ground into powder.

11. The preparation process according to claim 1 wherein the initiation of the polymerization is carried out at $-10°$ to $40°$ C., and afterward the polymerization is done in accordance with a spontaneous temperature rise.

12. The preparation process according to claim 11 wherein the obtained polymer is further shredded, dried, and then ground into powder.

13. The preparation process according to claim 1 wherein the weight-average molecular weight of the polymer is in the range of 2,000,000 to 20,000,000.

14. The preparation process according to claim 13 wherein the obtained polymer is further shredded, dried, and then ground into powder.

15. The preparation process of claim 1 wherein the reducing agent is sulfur oxides selected from the group consisting of sulfites, hydrogen sulfites pyrosulfites and sulfoxylates.

16. A process for producing a flocculent which comprises a powdery high-molecular weight acrylamide polymer, said process comprising preparing the high-molecular weight acrylamide polymer in the presence of an oxidation-reduction system polymerization initiator comprising a reducing agent and two or more kinds of oxidizing agents selected from the group consisting of persulfates, hydrogen peroxide, metal peroxides, hydroperoxides, dialkyl peroxides, diacyl peroxides, ketone peroxides, dialkylperoxy dicarbonates, peracids and peracid esters, and shredding, drying, and then grinding said polymer.

* * * * *

UNITED STATES PATENT AND TRADEMARK OFFICE
CERTIFICATE OF CORRECTION

PATENT NO.   : 5,668,229

DATED:       : September 16, 1997

INVENTOR(S)  : Takashi ABE et al

It is certified that error appears in the above-identified patent and that said Letters Patent is hereby corrected as shown below:

On the face of patent, listed under "Other Publications", line 3 of first publication, delete "JP0-A-02086603" and insert --JP-A-02086603--.

In claim 8, column 18, line 21, delete "2" and insert --7--.

Signed and Sealed this

Fifth Day of May, 1998

Attest:

BRUCE LEHMAN

Attesting Officer

Commissioner of Patents and Trademarks